(12) United States Patent
Kulidjian et al.

(10) Patent No.: US 6,483,680 B1
(45) Date of Patent: Nov. 19, 2002

(54) MAGNETIZING INRUSH RESTRAINT METHOD AND RELAY FOR PROTECTION OF POWER TRANSFORMERS

(75) Inventors: Ara Kulidjian, Toronto (CA); Bogdan Kasztenny, Markham (CA)

(73) Assignee: General Electric Co., Schenectady, NY (US)

( * ) Notice: Subject to any disclaimer, the term of this patent is extended or adjusted under 35 U.S.C. 154(b) by 283 days.

(21) Appl. No.: 09/621,732

(22) Filed: Jul. 21, 2000

Related U.S. Application Data
(60) Provisional application No. 60/159,115, filed on Oct. 13, 1999.

(51) Int. Cl.[7] .............................. H02H 7/04; H02H 3/42; H02H 3/26
(52) U.S. Cl. .............................. 361/36; 361/85; 361/87; 361/93.1; 361/93.9; 361/115
(58) Field of Search .............................. 361/35, 36, 85, 361/87, 93.1, 93.9, 115

(56) References Cited

U.S. PATENT DOCUMENTS

| | | | |
|---|---|---|---|
| 3,754,163 A | 8/1973 | Sykes | 317/14 D |
| 3,832,600 A | 8/1974 | Specht | 317/14 D |
| 4,175,276 A * | 11/1979 | Smith | 361/36 |
| 4,402,028 A | 8/1983 | Udren | 361/36 |
| 4,704,653 A | 11/1987 | Li | 361/36 |
| 4,772,978 A * | 9/1988 | Oura et al. | 340/646 |
| 5,014,153 A | 5/1991 | Wilkerson | 361/36 |
| 5,045,778 A | 9/1991 | Thibodeau et al. | 324/133 |
| 5,170,308 A | 12/1992 | Inagaki et al. | 361/36 |
| 5,172,329 A | 12/1992 | Rahman et al. | 364/483 |
| 5,627,712 A | 5/1997 | Wilkinson | 361/36 |
| 5,754,383 A * | 5/1998 | Huppertz et al. | 361/115 |
| 5,784,233 A | 7/1998 | Bastard et al. | 361/36 |
| 5,809,045 A * | 9/1998 | Adamiak et al. | 702/59 |
| 5,835,365 A | 11/1998 | Lee | 363/49 |
| 5,894,396 A | 4/1999 | Kim | 361/103 |
| 5,909,656 A | 6/1999 | Yang | 702/77 |
| 6,311,307 B1 * | 10/2001 | Adamiak et al. | 714/799 |

\* cited by examiner

*Primary Examiner*—Bao Q. Vu
(74) *Attorney, Agent, or Firm*—Karl Vick; Kevin Duncan; Hunton & Williams

(57) ABSTRACT

A method and relay for magnetizing inrush restraint in protective relays for power transformers. The method utilizes the phase angle relation between the fundamental component and the second harmonic in addition to the magnitude ratio. This is accomplished by calculating and utilizing the complex second harmonic ratio. The specially shaped operating characteristic for the complex second harmonic ratio is made dynamic providing for better security without jeopardizing dependability of the transformer protective relay.

24 Claims, 9 Drawing Sheets

MAGNETIZING INRUSH RESTRAINT METHOD AND RELAY FOR PROTECTION OF POWER TRANSFORMERS

This case is a continuation of U.S. Provisional Application No. 60/159,115 filed Oct. 13, 1999.

BACKGROUND OF THE INVENTION

The invention generally relates to fault protection of power transformers, and more specifically, to providing appropriate restraint for the main differential protection function during magnetizing inrush conditions.

Power transformers belong to a class of vital and very expensive components in electric power systems. If a power transformer encounters an internal short-circuit, it becomes necessary to take the transformer out of service within milliseconds so that the damage to the transformer and the surrounding system is minimized. Accordingly, high demands are imposed on power transformer protective relays. The requirements include dependability (no missing operations), security (no false trippings), and speed of operation (short fault clearing time).

A differential principle is commonly applied for protection of medium and large power transformers. A differential current is formed out of the terminal currents of a protected transformer using an external circuit (analog relays) or by the protective relay itself (microprocessor-based relays) in such a way that the differential current reflects an internal fault current. The differential current is close to zero when the protected transformer is sound and increases dramatically during internal faults.

Practically, the differential current may not be perfectly zero during normal operation of a power transformer due to certain factors such as limited accuracy of Current Transformers (CTs) used to measure the primary currents, operation of an on-load tap changer, or saturation of the CTs during external faults. To overcome this difficulty the stabilized (biased or percentage) differential principle is used which compares the differential current against a reference (restraint or stabilizing) current rather than against a fixed threshold. The restraint signal is created to reflect external fault currents.

Important issues related to differential protection of three-phase power transformers include phase angle and ratio matching, compensation for the ratio mismatch caused by operation of an on-load tap changer, CT saturation during external faults, and stationary overexcitation of the core (over-fluxing).

A separate issue of concern is a spurious differential current occurring when the core of the protected transformer is magnetized.

Magnetizing inrush current in power transformers results from any abrupt change of the transformer's terminal voltage. Although usually considered a result of energizing a transformer, the magnetizing inrush may be caused by other factors such as occurrence of an external fault, voltage recovery after clearing an external fault, change of the character of a fault (evolving faults), and out-of-phase synchronizing of a connected generator.

Since the magnetizing branch representing the core of a transformer appears as a shunt element in the transformer equivalent circuit, the magnetizing current upsets the balance between the currents at the transformer terminals, and is therefore experienced by the differential relay as a spurious differential current threatening malfunction of the relay.

Initial magnetizing due to switching a transformer on is generally considered to cause the most severe case of an inrush. When a transformer is de-energized (switched-off), the magnetizing voltage is taken away, the magnetizing current goes to zero while the flux follows the hysteresis loop of the core. This results in certain remanent flux left in the core. When, afterwards, the transformer is re-energized by an alternating sinusoidal voltage, the flux becomes also sinusoidal but it is biased by the remanence. The residual flux may be as high as 80–90% of the rated flux, and therefore, it may shift the flux-current trajectories far above the knee-point of the characteristic resulting in saturation of the core, and consequently, large peak values and heavy distortions of the magnetizing current.

A typical waveform of the magnetizing inrush current contains a large and long lasting dc component, is rich in harmonics, has large peak values at the beginning, and decays substantially after a few tenths of a second, though a full decay occurs only after several seconds. The shape, magnitude and duration of the inrush current depend on several factors. The major ones include the rated power of the transformer, the short-circuit capability of the system from which the transformer is energized, the magnetic properties of the core, the remanence in the core, the moment and way the transformer is switched on.

Typical magnetizing inrush current is rich in harmonics with the second harmonic predominating. The minimum content of the second harmonic depends mainly on the knee-point of the magnetizing characteristic of the core. The lower the saturation flux density, the higher the amount of the second harmonic. Modern transformers built with improved magnetic materials have high knee-points, and therefore, their inrush currents contain comparatively low amounts of the second harmonic.

Modern methods of restraining differential relays rely on discriminating magnetizing inrush and internal fault conditions either indirectly (analysis of the available terminal signals of a transformer) or directly (extra sensors installed within the tank of a transformer such as the method disclosed in U.S. Pat. No. 3,832,600).

Analysis of the traditionally available terminal signals is the most common approach and includes several solutions with the harmonic restraint predominating.

The harmonic restraint permits tripping if the harmonic content is low; it inhibits the relay if the harmonic content is high. Mathematically, regardless of the applied relay technology and particular filtering solution, the harmonic-based restraint can be written as follows:

$$TP = I_{CH} < \Delta I_{CD} \qquad (1)$$

where:
  TP Trip Permission flag from the magnetizing inrush detector,
  $I_{CH}$ Combined Harmonic component in the differential current,
  $I_{CD}$ Combined Differential current,
  $\Delta$ threshold.

Condition (1) originates a whole family of circuits (analog relays) or algorithms (microprocessor-based relays) due to various approaches to the combined currents $I_{CH}$ and $I_{CD}$.

In the most common approach the amplitude of the second harmonic in the differential current in a given phase is the combined harmonic signal, while the amplitude of the fundamental frequency component in the differential current in the same phase is used as the combined differential current.

Depending on exact formulae employed for the combined harmonic and differential signals, magnetic properties of the core, and the required security/dependability balance, the threshold $\Delta$ in (1) would be set at slightly different values. Generally, however, the parameter $\Delta$ is set at about 0.15–0.20 (15–20%).

The harmonic restraint may be further refined. The method disclosed in U.S. Pat. No. 4,402,028 uses both the harmonic restraint and a voltage change function. The voltage change function determines whether or not the differential element requires harmonic restraint supervision, preempting such supervision when it is not required, to enable faster trip decisions to be made by the differential function.

The harmonic restraint in general, regardless of the method of composing the harmonic and differential signals (type of pre-filtering, type of phasor estimation, per phase versus three-phase operation, cross-phase restraining), faces certain limitations.

The most weighty limitation is that in modern transformers the amount of higher harmonics in the magnetizing current may drop well below 10% (the second harmonic as low as 7%, while the total harmonic content at a level of less than 8%). Under such circumstances, the setting $\Delta$ in (1) would have to be adjusted significantly below some 10%. This would lead, however, to delayed operation of the relay if not to the failure to operate during internal faults when the currents may be polluted with harmonic due to saturation of the CTs.

Another group of restraint techniques relies on direct wave-shape analysis. There are basically two restraining methods of this kind.

The first approach analyzes if the differential current contains periodically repeating intervals of low and flat values ("dwell-time" approach). Such intervals are signatures of the magnetizing inrush and if detected, they inhibit the main differential function.

The two most consequential weaknesses of this approach are:

CTs, when saturated during inrush conditions (very likely due to the dc component in the current), change the shape of the waveform within the "dwell-time" intervals and may cause malfunction of the relay.

During severe internal faults, when the CTs saturate, the secondary currents may exhibit spurious "dwell-time" intervals jeopardizing dependability of the relay (failure to trip).

The second algorithm of this class analyses polarity (sign) of the peak values and the decaying rate of the inrush current. The relay would be restrained if the two consecutive peaks of the differential current are of the same polarity and are displaced by approximately half of the power system cycle. Ideally, this method needs three quarters of a cycle to distinguish between internal faults and inrush conditions.

Practically, however, this restraint principle has its limitations. In a three-phase transformer not always the differential currents are of the typical inrush shape in all three phases. Therefore, the three-phase transformer protection would need a kind of cross-phase restraint.

Another group of techniques suitable for microprocessor-based relays relies on solving on-line the mathematical model of a fault-free transformer. Either certain parameters of the model are computed assuming the measured signals; or certain fraction of the terminal variables are computed based on all the remaining signals, and next compared to their measured counterparts. In the first case such as in the method disclosed in U.S. Pat. No. 5,170,308, the values of the calculated parameters differentiate internal faults from other disturbances (including inrush conditions). In the second case such as in the method disclosed in U.S. Pat. No. 3,754,163, the difference between the calculated and measured signals enables the relay to perform the classification.

Another relaying principle uses the differential active power to discriminate between internal faults and other conditions (including magnetizing inrush). The operating signal is a difference between the instantaneous powers at all the terminals of a protected transformer.

Yet another restraining algorithm suitable for microprocessor-based relays differentiates internal faults from magnetizing inrush conditions using the flux in the transformer's core estimated (calculated) on-line from the available terminal voltages and currents.

The known methods of dealing with the magnetizing inrush problem leave significant room for improvement. It would be desirable to improve security without jeopardizing dependability of the main differential function.

SUMMARY OF THE INVENTION

The present invention overcomes the disadvantages of known inrush restraining methods without jeopardizing the dependability of the transformer protection relay.

In the disclosed embodiments, an inrush restraining method responds to a complex second harmonic ratio.

In one embodiment, a Fourier series of the fundamental frequency component and higher harmonics represents the waveform of the differential current. The fundamental frequency component is a phasor rotating at the system radian frequency. The second harmonic component is a phasor rotating at exactly twice the system frequency. The traditional second harmonic restraint measures and uses the ratio of the magnitudes of the second harmonic and the fundamental component neglecting the phase angle information.

The present invention utilizes the phase angle relation between the fundamental component and the second harmonic in addition to the magnitude ratio. This is accomplished by calculating a complex second harmonic ratio, a complex number having a magnitude based on a traditional second harmonic ratio of the magnitudes, and an argument based on a phase angle between the fundamental frequency component and the second harmonic.

When the traditional second harmonic ratio drops below the usual threshold setting during magnetizing inrush conditions jeopardizing the security, the phase angle of the complex second harmonic ratio follows certain characteristic pattern. That pattern enables the differentiation between internal faults and magnetizing inrush cases.

Considering the differences between internal faults and magnetizing inrush conditions in both the magnitude and phase angle of the complex second harmonic ratio, an optimal operating characteristic has been defined as a part of this invention. The characteristic is dynamic: it changes in time providing more security when needed and enhancing dependability when possible.

BRIEF DESCRIPTION OF THE DRAWINGS

The present invention and its resulting advantages can be more fully understood by reading the following Detailed Description in conjunction with the accompanying drawings, in which:

As seen in FIG. 2(b), the second harmonic ratio drops below the typical threshold of 20% and stays low for several power system cycles;

DETAILED DESCRIPTION

A. Introduction

Figure 1:
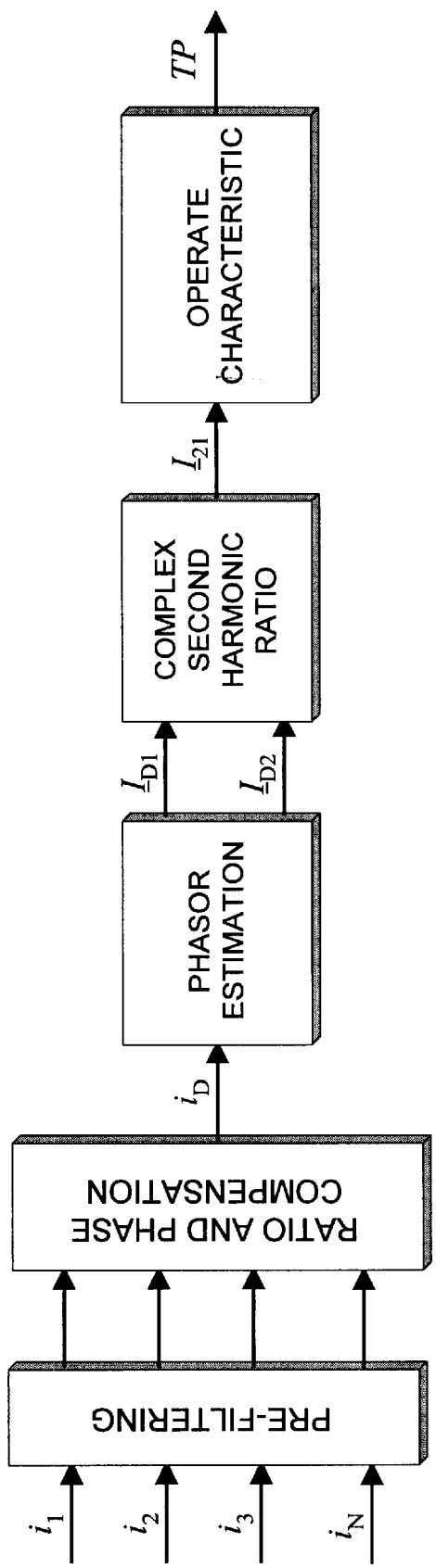
FIG. 1 is a block diagram of a harmonic restraint method according to an embodiment of the present invention.

With reference to FIG. 1 a second harmonic restraint technique according to an embodiment of the present invention sets the Trip Permission (TP) flag allowing the main differential function to trip in a sequence of five basic operations. It will be appreciated that the three initial operations are generally present in some form in any conventional transformer differential relay and are not the subject of this invention.

In operation 100, the transformer's terminal currents $i_1 \ldots i_N$ (considering a general case of an N-winding transformer) as measured by the relay through the current transformer (CTs) associated therewith and converted to a digital form by a sampling and digitizing operation performed by the relay, are digitally pre-filtered by the relay to remove certain signal distortions, particularly the decaying d.c. (direct current) components. One particular method involves sampling input currents at 64 samples per cycle of the fundamental frequency and uses a 21-tap Finite Impulse Response (FIR) filter for pre-filtering. While pre-filtering is desirable for embodiments of the present invention, any effective solution can be used, and this invention is not limited to any particular pre-filtering technique.

In operation 102, the ratio and phase compensation is performed by the relay processing circuitry on the filtered input signals to generate the differential current, $i_D$. The operation is a procedure of combining the terminal currents into the differential signal taking into account the well-known rules of differential relaying for three-phase power transformers. This may include dynamic ratio compensation if an on-load tap changer is installed on the protected transformer. The present invention is not limited to any particular method of calculating the differential current.

In operation 104, the differential signal, $i_D$, is fed into a phasor estimator where the phasors of the fundamental frequency component, $I_{D1}$, and the second harmonic, $I_{D2}$, are calculated. One particular method and relay uses the full-cycle Fourier algorithm for phasor estimation. Any effective solution can be used to provide the phasor estimator. The present invention is not limited to any particular kind of phasor estimator.

In addition, the linear operations of pre-filtering, calculating the differential current, and phasor estimation may be merged or be applied in a different sequence than that shown in FIG. 1. The present invention is not limited to any particular sequence of operations 100, 102, and 104.

In step 106, the complex second harmonic ratio is calculated from the input phasors of the fundamental frequency component and the second harmonic in a manner to be described below.

In step 108, the value of the complex second harmonic is checked against a special operating characteristic. If the value of the complex second harmonic ratio allows for tripping, a trip permission flag, TP, is set in the relay.

B. The Complex Second Harmonic Ratio

According to a preferred embodiment of the present invention, the complex second harmonic ratio is calculated as the following complex number:

$$I_{21} = \frac{|I_{D2}|}{|I_{D1}|} \langle ang(I_{D2}) - 2 \cdot ang(I_{D1}) \tag{2a}$$

where:

|.| stands for the magnitude of a phasor, and ang(.) stands for the phase angle of a phasor.

In all the further description it is assumed that the real part of the phasor is measured digitally using the sine Fourier filter, and the imaginary part—using the cosine part. Alternative ways of defining the phasors would appropriately change the blocking and tripping regions of the characteristic, such as shifting it by 90 degrees. The invention is not limited to any particular way of defining the phasor.

By multiplying the phase angle of the fundamental frequency component by 2, the rotation speed of the fundamental frequency phasor gets virtually increased by the factor of 2 and meets precisely the rotation rate of the second harmonic. Consequently, the "sped-up" fundamental frequency phasor and the second harmonic are brought to the same time scale and the phase shift between them becomes defined and may be used by the protective relay. The same effect can be accomplished by using the following general expression for the second harmonic ratio:

$$\frac{|I_{D2}|}{|I_{D1}|} \langle \alpha \cdot ang(I_{D2}) - \beta \cdot ang(I_{D1}) \tag{2b}$$

providing $$\beta = 2 \cdot \alpha \tag{2c}$$

Upon selection of $\alpha$ and $\beta$ other than $\beta=2$ and $\alpha=1$, the operating characteristic would have to be modified as compared with the characteristic presented in this invention. The present invention, although uses $\beta=2$ and $\alpha=1$, is not limited to any combination of $\alpha$ and $\beta$.

C. The Operating Characteristic

Embodiments of the present invention rely on the discovery that the phase shift between the fundamental frequency component and the second harmonic maintains a certain pattern during magnetizing inrush conditions. Thus, it may be treated as a "signature" of the magnetizing inrush and may be effectively utilized by the invented restraining algorithm.

FIG. 2a presents a plot of the differential current during sample magnetizing inrush conditions. FIG. 2b shows a plot of the traditional second harmonic ratio. As seen from the figure, the second harmonic ratio drops below some 20% for a comparatively long period of time. This would cause malfunction of a relay that uses the traditional second harmonic restraint unless the relay is set to have a very low second harmonic threshold.

Figure 2:
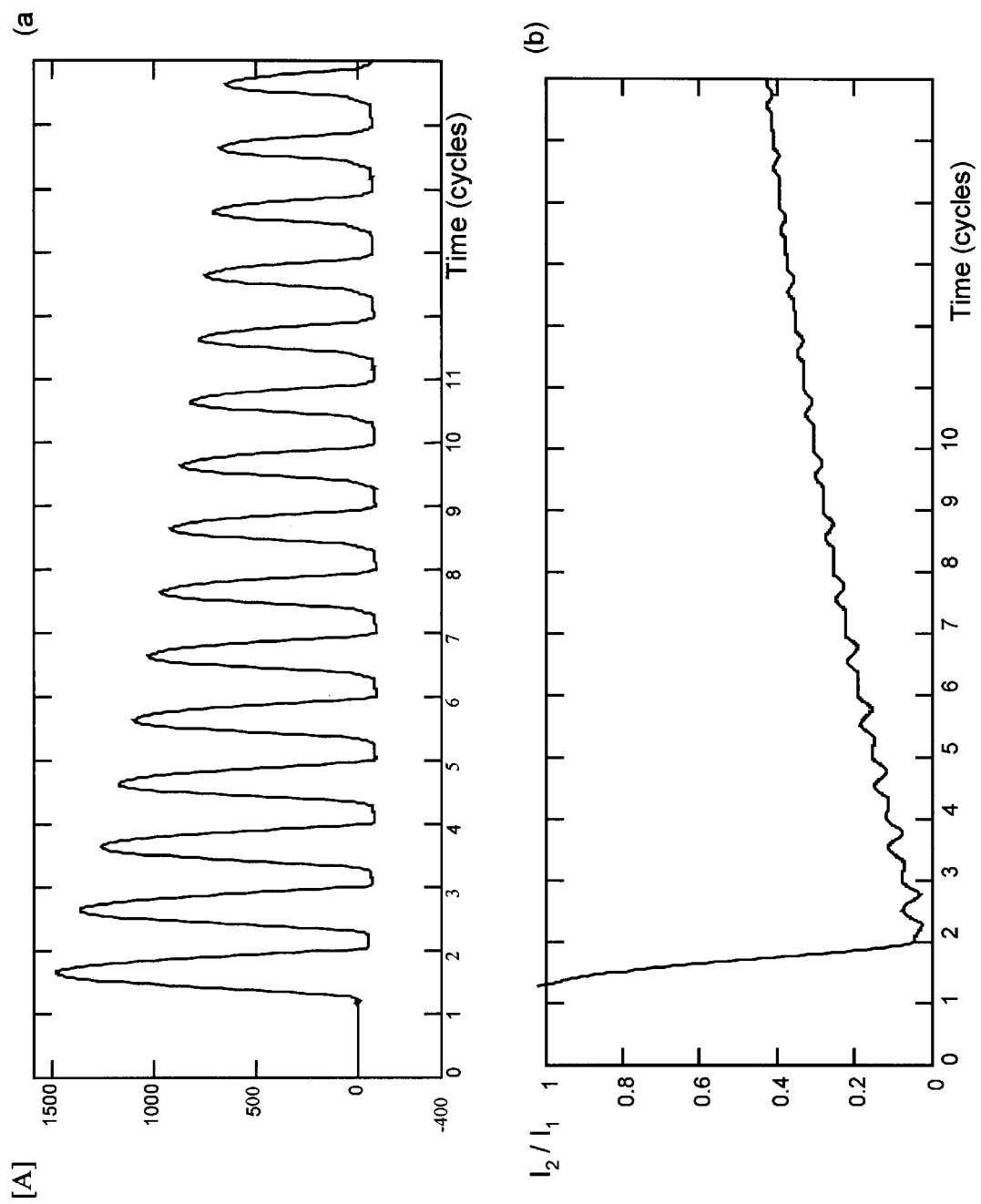
FIGS. 2a–2b show a current waveform and second harmonic ratio, respectively, of sample differential current that may appear to the transformer protective relay during magnetizing inrush conditions.
Figure 3:
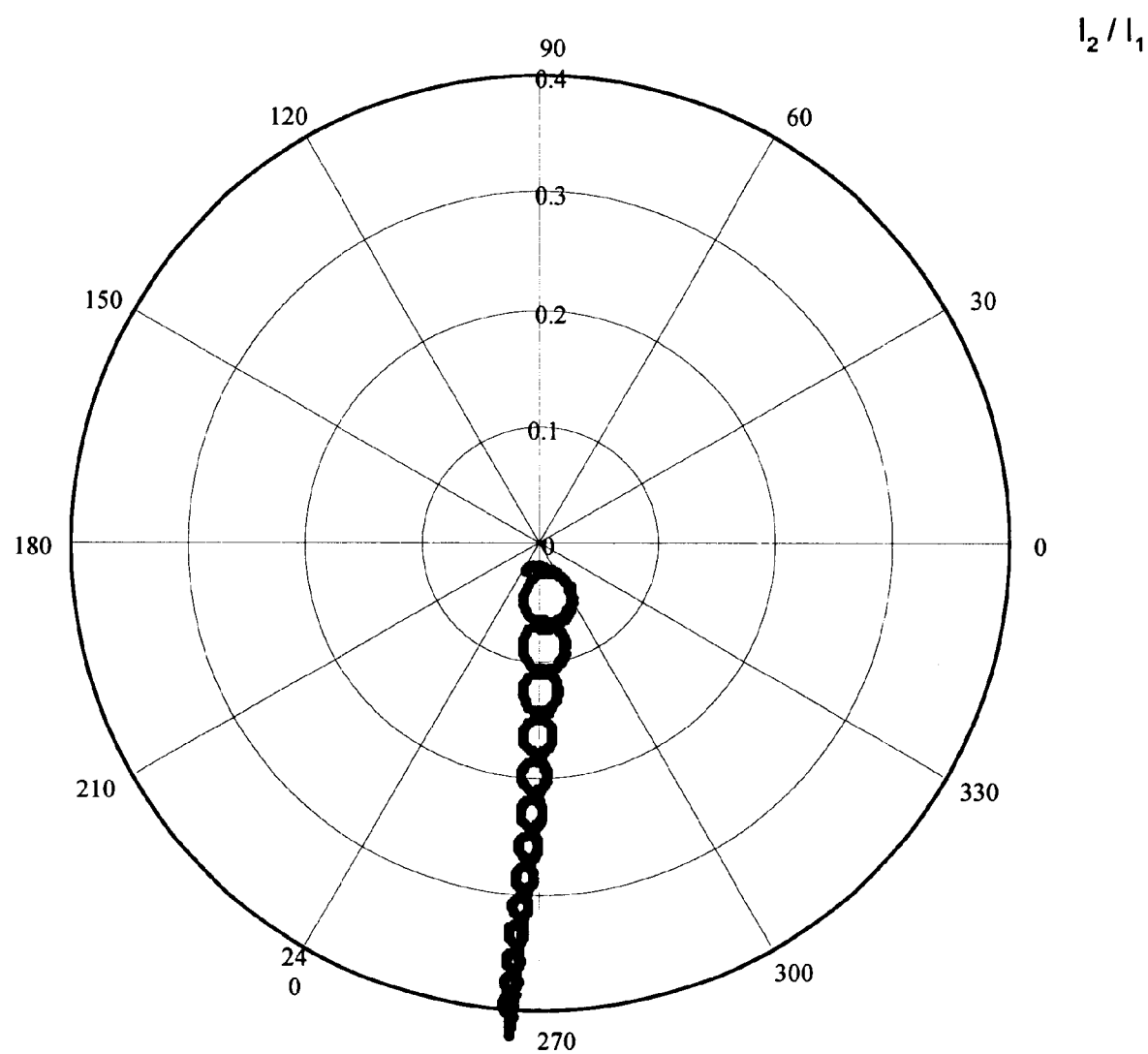
FIG. 3 shows a trajectory of the complex second harmonic ratio for the sample magnetizing inrush case of FIGS. 2a–2b.
Figure 4:
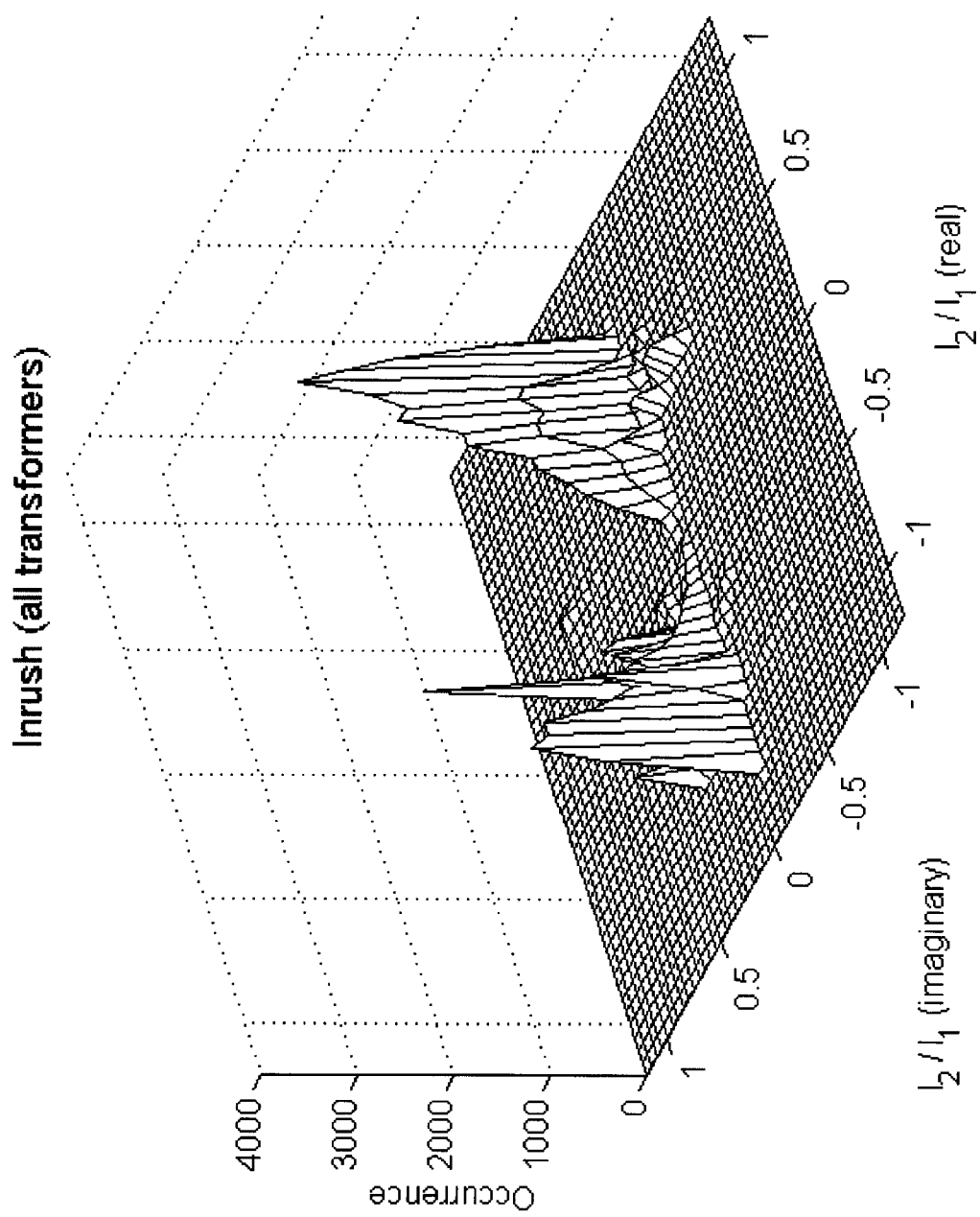
FIG. 4 is a histogram of the complex second harmonic ratio for a number of magnetizing inrush cases for a number of different transformers.
Figure 5:
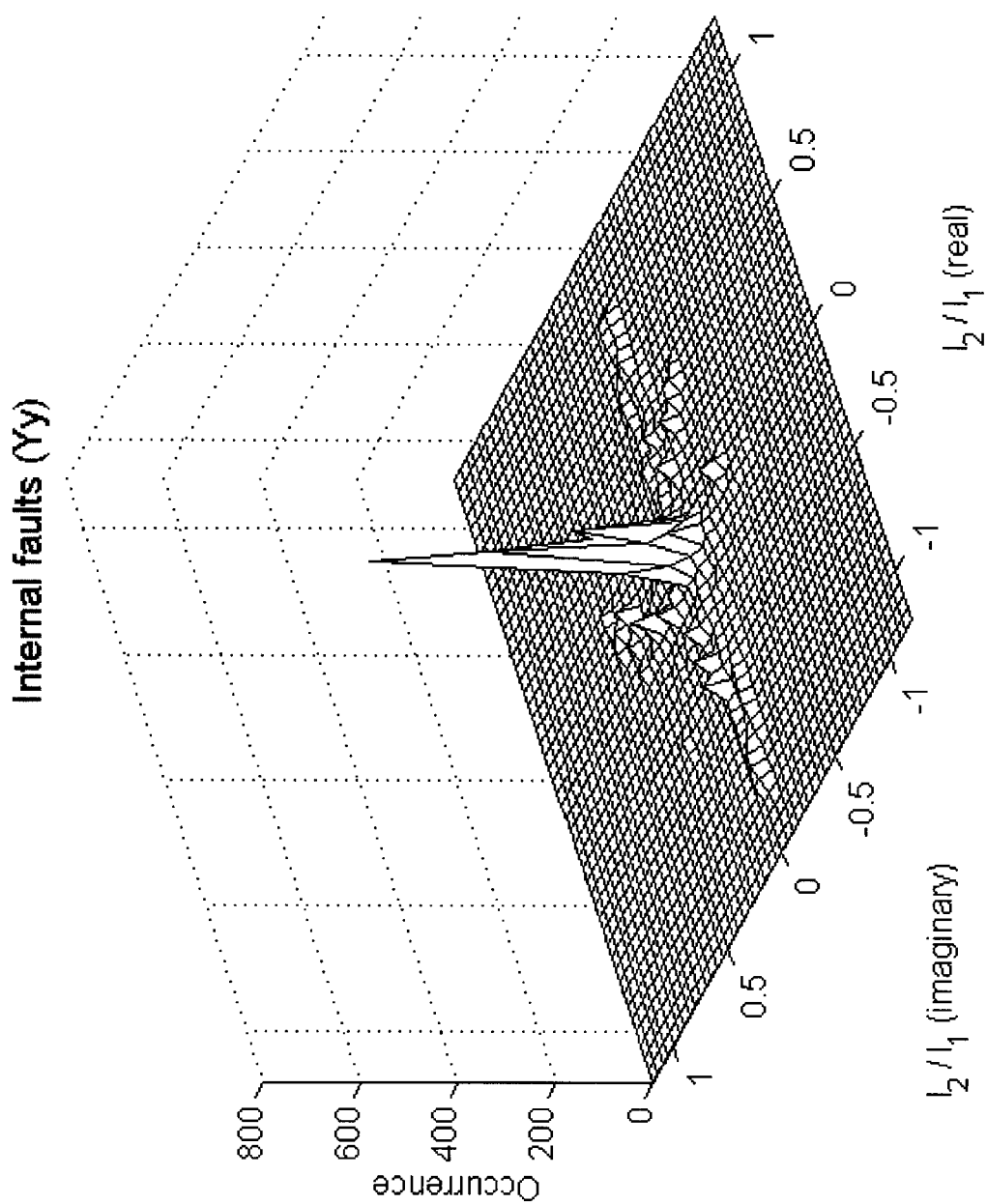
FIG. 5 is a histogram of the complex second harmonic ratio for a number of internal fault cases for a number of different wye-wye connected transformers.
Figure 6:
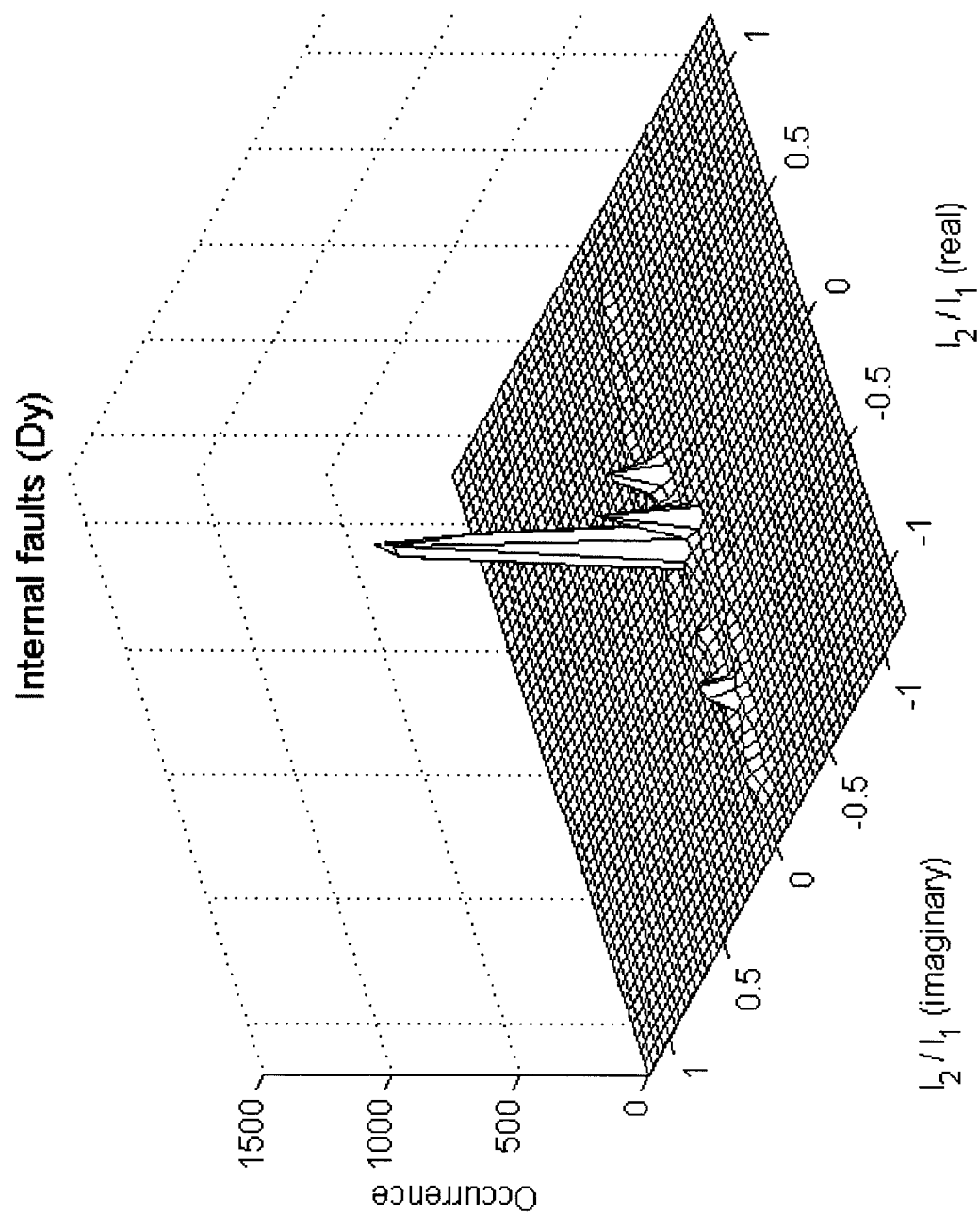
FIG. 6 is a histogram of the complex second harmonic ratio for a number of internal fault cases for a number of different wye-delta connected transformers.

FIG. 3 shows a trajectory or locus (i.e., the variation over time) of the complex second harmonic ratio for the case of FIG. 2, using a two-dimensional plot of the complex plane. As expected, the trajectory enters the circle of the 20% radius, (i.e., the point at which the complex second harmonic ratio falls below 20%, or 0.2) but follows the path of approximately −90-degrees. It has been determined that for any type of a power transformer the trajectory would follow either a +90-degree or −90-degree path during magnetizing inrush conditions. During internal faults, the complex second harmonic ratio is relatively low and follows random and uniformly distributed paths. Thus, the overlapping between the magnetizing inrush and internal fault patterns is minimal allowing for good discrimination. To illustrate that, FIG. 4 shows a histogram of the complex second harmonic ratio, $\underline{I}_{21}$, for magnetizing inrush conditions in various transformers; FIG. 5 shows a histogram of $\underline{I}_{21}$ for internal faults in wye-wye connected transformers; FIG. 6 shows a histogram of $\underline{I}_{21}$ for internal faults in wye-delta connected transformers.

As seen from FIGS. 4–6, the amount of overlapping between internal faults and inrush patterns is significantly reduced. The shape shown in FIG. 4 is a basis for the operating characteristic to be determined and implemented by the relay processing circuitry.

Figure 7:
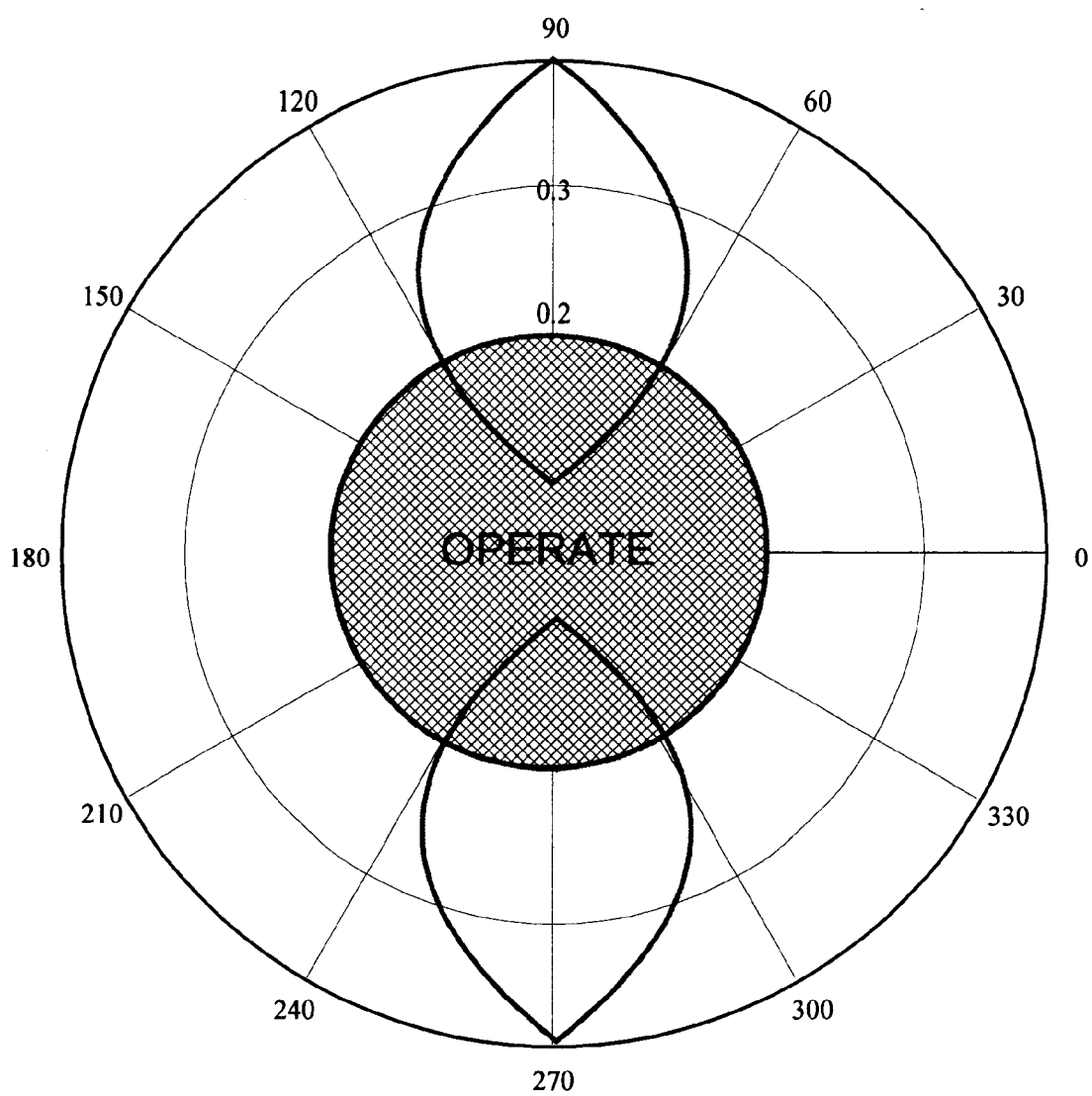
FIG. 7 presents the operating region for the complex second harmonic ratio. A traditional second harmonic restraint does not use phase angle information, and consequently, the traditional operating region is a circle on the complex plane.
Figure 8:
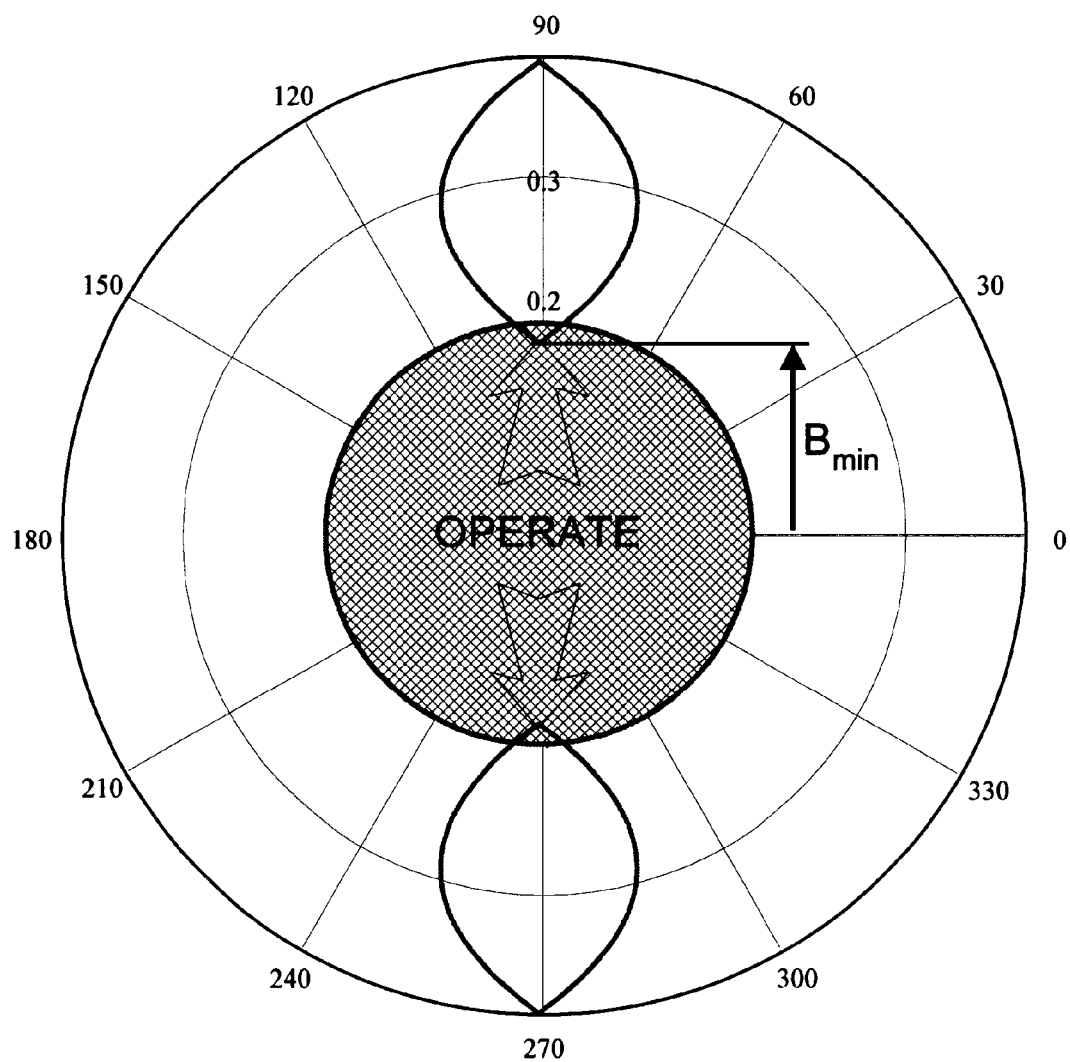
FIG. 8 illustrates the dynamic aspect of the operating characteristic of FIG. 7.

From FIG. 4 the following factors should be used by the relay processing circuitry to define the operating characteristic as shown in FIG. 7:
- the operating region stretches between approximately ±20% for angles relatively close to 0 and 180 degrees (which is equivalent to the traditional second harmonic restraint),
- for angles close to ±90 degrees the operating region is cut with two specific shapes (e.g., mathematical functions defined and applied by the relay processing circuitry) ensuring blocking operation for low values of the second harmonic,
- the boundary definitions of the operating and blocking regions are not stationary, but are functions of time; initially the "cuts" of the blocking region are very deep (FIG. 7), but after several cycles they disappear leaving a classical circular-like operating characteristic (FIG. 8).

One particular implementation defines the boundaries in the strict mathematical form of a lens.

The operating region is defined as:

$$TP = \left|ang\left(\frac{\underline{I}_{21} - jB_{min}}{\underline{I}_{21} - jB_{max}}\right)\right| < 180 - \alpha \text{ AND} \quad (3)$$

$$\left|ang\left(\frac{\underline{I}_{21} + jB_{min}}{\underline{I}_{21} + jB_{max}}\right)\right| < 180 - \alpha \text{ AND } |x| < \Delta$$

where: $j$ is an imaginary unit ($j = \sqrt[2]{-1}$), $\Delta$ is the traditional second harmonic threshold (in one particular implementation the default value is 0.2), $B_{max}$ is a constant (in one particular implementation set at $$\frac{4}{3\pi}),$$

$\alpha$ is a constant (in one particular implementation set at 30 degrees), $B_{min}$ is either a constant or an appropriate function of time.

However, any shape consistent with the histogram of FIG. 4 could be used instead of the one defined as (3). An effective shape of the two "cuts" would typically be close to a lens shape, but does not have to be mathematically a lens itself. This invention is not limited to any particular shape of the cuts in the operating characteristic.

Figure 9:
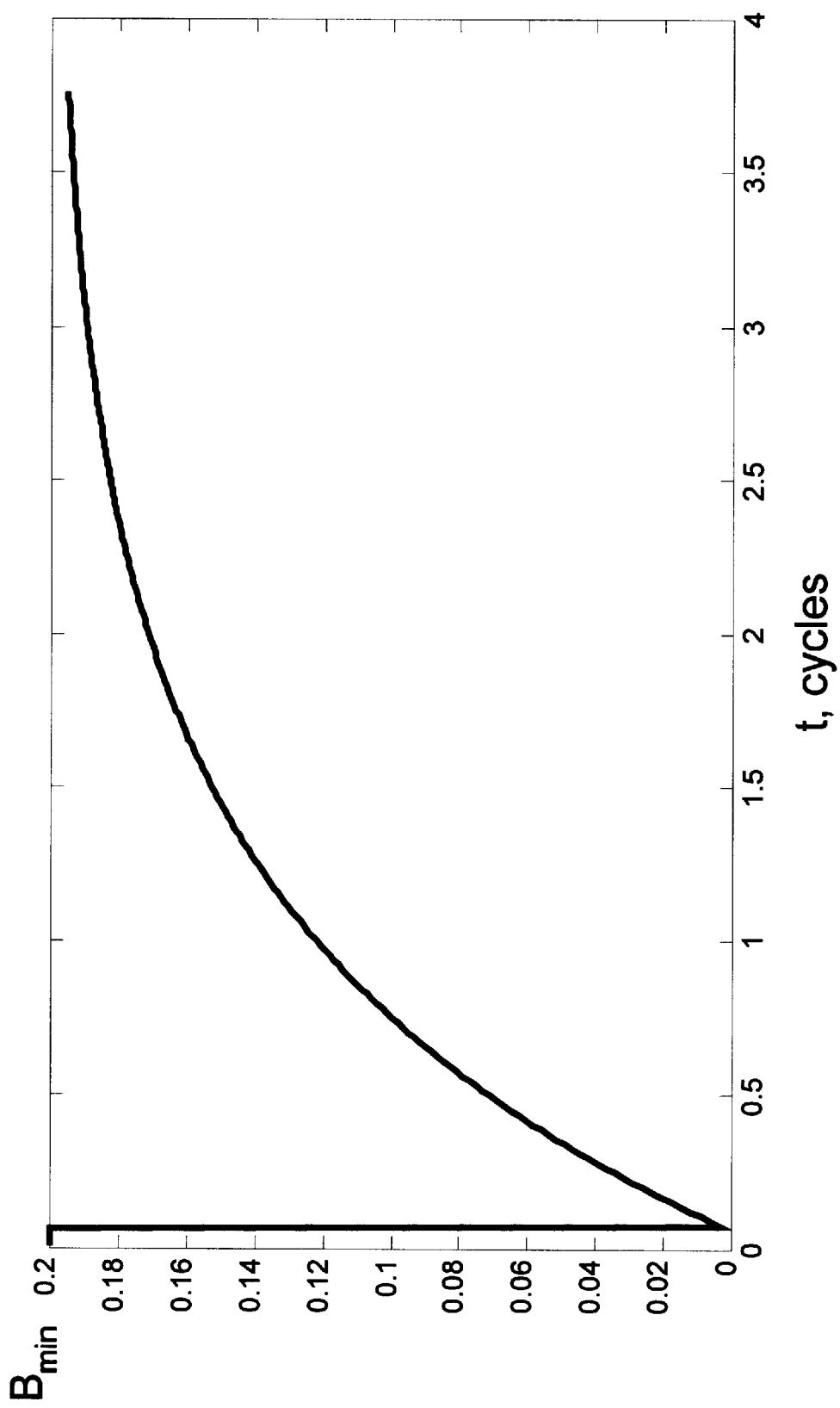
FIG. 9 shows a sample time dependency of the parameter $B_{min}$ of the two cuts in the operating characteristic from FIG. 8.

One particular implementation uses the dynamic characteristic which employs an exponential function shown in FIG. 9 to dynamically contract the boundaries in the circular characteristic. Mathematically, this operation is given as:

$$B_{min} = B_{max} \cdot \left(1 - e^{-\frac{t}{T}}\right) \quad (4)$$

where:
T is a time constant in the range of a few power system cycles,
t is a time since detection of a disturbance.

However, this invention is not limited to any particular way of changing the characteristic and covers the stationary (i.e. not dynamic) characteristic as well.

One particular implementation and relay uses an initial overestimation of the complex second harmonic ratio to initiate the timer needed for control of the size of the cuts, i.e. to reset the time, t, in equation (4). Any effective solution could be applied. This invention is not limited to any particular way of timing for the dynamic characteristic.

The radius of the circular portion of the operating characteristic (e.g., 20%) ($\Delta$ in equation (3)) is a user-specified value. The present invention is not limited by any specific value of this constant.

The inrush restraint algorithm has been described assuming a per phase basis. This means that the differential signal derived for phase A is analyzed and the trip permission flag gets set appropriately for the phase A main differential function. The same applies to the phases B and C. It should be understood, however, that this invention is not limited to any particular system of coordinates for the differential currents of the three-phase system such as phase quantities, symmetrical components, Clarke components, and others.

While the foregoing description includes numerous details and specificities, it is to be understood that these are provided for purposes of explanation only, and are not intended to limit the scope of the invention. Those of ordinary skill in the art will easily be able to make numerous modifications to the exemplary embodiments described above without departing from the scope of the invention, as defined by the following claims and their legal equivalents.

What is claimed is:

1. A method for providing protective control to a power transformer, comprising the steps of:

receiving a plurality of input current signals;

generating a differential current signal from the input current signals;

generating phasor signals from the differential current signal, the phasor signals including a fundamental frequency component and a second harmonic component;

generating a complex second harmonic ratio based on a magnitude and a phase angle of the fundamental frequency component and the second harmonic component; and defining an operating characteristic of a protective control device based on the complex second harmonic ratio.

2. The method of claim 1, wherein the step of generating a complex second harmonic ratio is performed using:

$$I_{21} = \frac{|I_{D2}|}{|I_{D1}|} \langle ang(I_{D2}) - 2 \cdot \underline{ang(I_{D1})}$$

where $|\underline{I}_{D1}|$ is a magnitude of a first phasor, $|\underline{I}_{D2}|$ is a magnitude of a second phasor, and ang is a phase angle of a phasor.

3. The method of claim 2, wherein the first phasor is the fundamental frequency component and the second phasor is the second harmonic.

4. The method of claim 1, further comprising the step of discriminating between internal faults and magnetizing inrush conditions by:

calculating the complex second harmonic ratio; and comparing the value of the complex second harmonic against a specifically shaped operating region.

5. The method of claim 4, wherein the operating region varies over time.

6. The method of claim 4, wherein the operating region is a substantially circular region on a plot of the real and imaginary components of the complex second harmonic ratio with two discontinuous regions within a threshold variation of +90 degrees and −90 degrees lines of an imaginary axis on the plot.

7. The method of claim 5, wherein the operating region varies over time.

8. The method of claim 7, wherein an initial size of the operating region is set based on an estimated value of the complex second harmonic.

9. A method of controlling a protective relay, comprising the steps of:

calculating a complex second harmonic ratio based on magnitude and phase information for at least two phasor signals;

applying an operating characteristic for the protective relay based on the complex second harmonic ratio, the operating characteristic including an operating region and a blocking region, the operating region expanding over time.

10. The method of claim 9, wherein the step of calculating a complex second harmonic ratio is performed using:

$$I_{21} = \frac{|I_{D2}|}{|I_{D1}|} \langle ang(I_{D2}) - 2 \cdot \underline{ang(I_{D1})}$$

where $|\underline{I}_{D1}|$ is a magnitude of a first phasor, $|\underline{I}_{D2}|$ is a magnitude of a second phasor, and ang is a phase angle of a phasor.

11. The method of claim 10, wherein the first and second phasors are generated from a differential current signal representative of a plurality of input current signals.

12. The method of claim 11, wherein the first phasor is the fundamental frequency component of the differential current signal and the second phasor is the second harmonic of the differential current signal.

13. The method of claim 11, wherein the operating region varies over time.

14. The method of claim 9, wherein the operating region is a substantially circular region on a plot of the real and imaginary components of the complex second harmonic ratio with two discontinuous regions within a threshold variation of +90 degrees and −90 degrees lines of an imaginary axis on the plot.

15. The method of claim 13, wherein an initial size of the operating region is set based on an estimated value of the complex second harmonic.

16. The method of claim 15, wherein the operating region expands over time.

17. A protective relay, comprising:

connections to an electrical system;

processing circuitry configured to cause the protective relay to trip during an operating condition and to prevent the protective relay from tripping during a blocking condition, wherein the processing circuitry determines the operating condition and the blocking condition based on a complex second harmonic ratio derived from at least two phasors representative of a condition on the electrical system.

18. The protective relay of claim 17, wherein the processing circuitry generates the complex second harmonic ratio from phasor values representative of a magnitude and a phase of a differential current signal derived from the electrical system, and applies an operating characteristic for the protective relay, the operating characteristic including an operating region and a blocking region, the operating region expanding over time.

19. The protective relay of claim 17, wherein the complex second harmonic ratio is calculated as:

$$I_{21} = \frac{|I_{D2}|}{|I_{D1}|} \langle ang(I_{D2}) - 2 \cdot \underline{ang(I_{D1})}$$

where $|\underline{I}_{D1}|$ is a magnitude of a first phasor, $|\underline{I}_{D2}|$ is a magnitude of a second phasor, and ang is a phase angle of a phasor.

20. The method of claim 17, wherein a first phasor is the fundamental frequency component of the differential current signal and a second phasor is the second harmonic of the differential current signal.

21. The method of claim 18, wherein the operating region varies over time.

22. The method of claim 18, wherein the operating region can be defined by a substantially circular region on a plot of the real and imaginary components of the complex second harmonic ratio with two discontinuous regions along the +90 degrees and −90 degrees lines of the plot.

23. The method of claim 21, wherein the operating region expands over time.

24. The method of claim 23, wherein an initial size of the operating region is set based on an estimated value of the second harmonic.

* * * * *